US011118474B2

United States Patent
Propheter-Hinckley et al.

(10) Patent No.: US 11,118,474 B2
(45) Date of Patent: Sep. 14, 2021

(54) VANE COOLING STRUCTURES (71) Applicant: UNITED TECHNOLOGIES CORPORATION, Farmington, CT (US)

(72) Inventors: Tracy A. Propheter-Hinckley, Manchester, CT (US); Raymond Surace, Newington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 686 days.

(21) Appl. No.: 15/727,816

(22) Filed: Oct. 9, 2017

(65) Prior Publication Data
US 2019/0107006 A1  Apr. 11, 2019

(51) Int. Cl.
*F01D 25/12* (2006.01)
*F01D 9/04* (2006.01)
*F23R 3/00* (2006.01)
*F02C 7/18* (2006.01)
(Continued)

(52) U.S. Cl.
CPC .............. *F01D 25/12* (2013.01); *F01D 5/141* (2013.01); *F01D 5/147* (2013.01); *F01D 5/186* (2013.01); *F01D 5/187* (2013.01); *F01D 9/041* (2013.01); *F02C 7/18* (2013.01); *F23R 3/002* (2013.01); *F05D 2220/32* (2013.01); *F05D 2230/10* (2013.01); *F05D 2230/21* (2013.01); *F05D 2240/35* (2013.01); *F05D 2240/81* (2013.01); *F05D 2260/201* (2013.01); *F05D 2260/202* (2013.01)

(58) Field of Classification Search
CPC .......... F01D 25/12; F01D 5/141; F01D 5/147; F01D 5/186; F01D 5/187; F01D 9/041; F02C 7/18; F23R 3/002; F05D 2220/32; F05D 2230/10; F05D 2230/21; F05D 2240/35; F05D 2240/81; F05D 2260/201; F05D 2260/202
See application file for complete search history.

(56) References Cited

U.S. PATENT DOCUMENTS

| 4,567,730 A * | 2/1986 | Scott ...................... F23R 3/007 60/752 |
| 4,821,522 A | 4/1989 | Matthews et al. |
| 6,082,961 A | 7/2000 | Anderson et al. |

(Continued)

FOREIGN PATENT DOCUMENTS

| EP | 1138878 | 10/2001 |
| EP | 1849965 | 10/2001 |

OTHER PUBLICATIONS

European Patent Office, European Search Report dated Jan. 4, 2019 in Application No. 18186880.3.

*Primary Examiner* — Arun Goyal
*Assistant Examiner* — Henry Ng
(74) *Attorney, Agent, or Firm* — Snell & Wilmer L.L.P.

(57) ABSTRACT

A vane platform cooling system may comprise a combustor shell and a combustor panel. A cavity may be located between the combustor shell and the combustor panel. A surface of the cavity may be angled toward the combustor shell. An orifice may be formed in a vane platform located aft of the combustor panel. A standoff located in the cavity may direct air toward the vane platform. An aperture may be formed in a surface of the vane platform. A channel formed through the vane platform may connect the orifice and aperture.

15 Claims, 6 Drawing Sheets

(51) Int. Cl.
*F01D 5/18* (2006.01)
*F01D 5/14* (2006.01)

(56) References Cited

U.S. PATENT DOCUMENTS

| | | | |
|---|---|---|---|
| 9,091,180 B2* | 7/2015 | Wiebe | F01D 25/00 |
| 9,752,447 B2 | 9/2017 | Clum et al. | |
| 2005/0100437 A1* | 5/2005 | Phillips | F01D 5/147 |
| | | | 415/115 |
| 2009/0077977 A1* | 3/2009 | Cayre | F23R 3/50 |
| | | | 60/757 |
| 2016/0108738 A1* | 4/2016 | Devore | F01D 25/12 |
| | | | 415/177 |
| 2016/0177758 A1 | 6/2016 | Clum et al. | |
| 2017/0335716 A1* | 11/2017 | Bergholz | F01D 5/188 |

* cited by examiner

VANE COOLING STRUCTURES

STATEMENT OF GOVERNMENT INTEREST

This disclosure was made with government support under Contract No. FA8650-15-D-2502/0002 awarded by the United States Air Force. The government has certain rights in the disclosure.

FIELD

The present disclosure relates to cooling structures for gas turbine engines and, more specifically, to vane platform cooling structures.

BACKGROUND

A gas turbine engine typically includes a fan section, a compressor section, a combustor section, and a turbine section. The fan section may drive air along a bypass flowpath while the compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The interface between a downstream edge of the combustor and an upstream edge of the first vane stage of the high pressure turbine may exhibit premature oxidization.

SUMMARY

A vane platform cooling system is disclosed herein, in accordance with various embodiments. The vane platform cooling system may comprise a vane platform and an orifice formed in a forward end of the vane platform. A first aperture may be formed in a surface of the vane platform. A first channel may be formed through the vane platform and may connect the orifice and the first aperture.

In various embodiments, the first channel may be configured such that air exits the first aperture at a first angle of less than 20° relative to the surface of the vane platform. A second angle formed by a surface defining the first channel and a plane parallel to the surface of the vane platform may be between 5° and 15°. In various embodiments, a cross-sectional area of the first aperture may be greater than a cross-sectional area of the first channel.

In various embodiments, a second aperture may be formed in the surface of the vane platform. A second channel may be formed through the vane platform and may connect the orifice and the second aperture. In various embodiments, an airflow structure may be located in the first channel. The airflow structure may comprise at least one of a teardrop shape, an airfoil shape, a pedestal shape, or a racetrack shape.

In various embodiments, a combustor shell may be located forward of the vane platform. A combustor panel may be coupled to the combustor shell. A cavity may be located between the combustor shell and the combustor panel. A surface defining the cavity may be angled toward the combustor shell. In various embodiments, a ramp may be coupled to an exterior surface of the combustor panel. The ramp may include the surface defining the cavity. A standoff may be located in the cavity. The standoff may comprise at least one of a teardrop shape, an airfoil shape, or a racetrack shape.

A gas turbine engine is disclosed herein, in accordance with various embodiments. The gas turbine engine may comprise a combustor. The combustor may comprise a combustor shell defining a combustion chamber of the combustor. A combustor panel may be disposed inside the combustion chamber. A cavity may be located between the combustor shell and the combustor panel. A surface defining the cavity may be angled toward the combustor shell. A vane platform may be located aft of an outlet of the combustor. An orifice may be formed in a forward end of the vane platform. A first aperture may be formed in a surface of the vane platform. A first channel may be formed through the vane platform and may connect the orifice and the first aperture.

In various embodiments, a ramp may be coupled to the combustor panel. The ramp may comprise the surface defining the cavity. In various embodiments, a standoff may be located in the cavity. The standoff may be integral to the ramp. In various embodiments, a plurality of airflow structures maybe located in the first channel. A first airflow structure of the plurality of airflow structures may be configured to direct airflow in a first direction. A second airflow structure of the plurality of airflow structures may be configured to direct airflow in a second direction different from the first direction.

In various embodiments, a second aperture may be formed in the surface of the vane platform. A second channel may be formed through the vane platform and may connect the orifice and the second aperture.

A method of cooling a first vane stage platform system of a high pressure turbine is disclosed herein, in accordance with various embodiments. The method may comprise forming an impingement hole through a combustor shell. The impingement hole may allow cooling air to flow into a cavity located between the combustor shell and a combustor panel. The method may further comprise angling a surface of the cavity away from a gap defined by an aft end the combustor panel and a vane platform of the first vane stage platform system, forming an orifice in a forward end of the vane platform, forming an aperture in a surface of the vane platform, and forming a channel fluidly connecting the orifice and the aperture.

In various embodiments, the method may further comprise forming a plurality of airflow structures in the channel. Each airflow structure of the plurality of airflow structures may comprise at least one of a teardrop shape, an airfoil shape, a pedestal shape, or a racetrack shape. The orifice, the aperture, the channel, and the plurality of airflow structures may be formed during a manufacturing of the vane platform. In various embodiments, angling the surface of the cavity may comprise manufacturing the combustor panel to include a sloped exterior surface. In various embodiments, angling the surface of the cavity may comprise coupling a discrete ramp to an exterior surface of the combustor panel. In various embodiments, the method may further comprise forming the orifice, the aperture, and the channel by at least one of integral casting, electrical discharge machining, laser drilling, or punching through the vane platform.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As used herein, "proximate" refers to a direction inwards, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
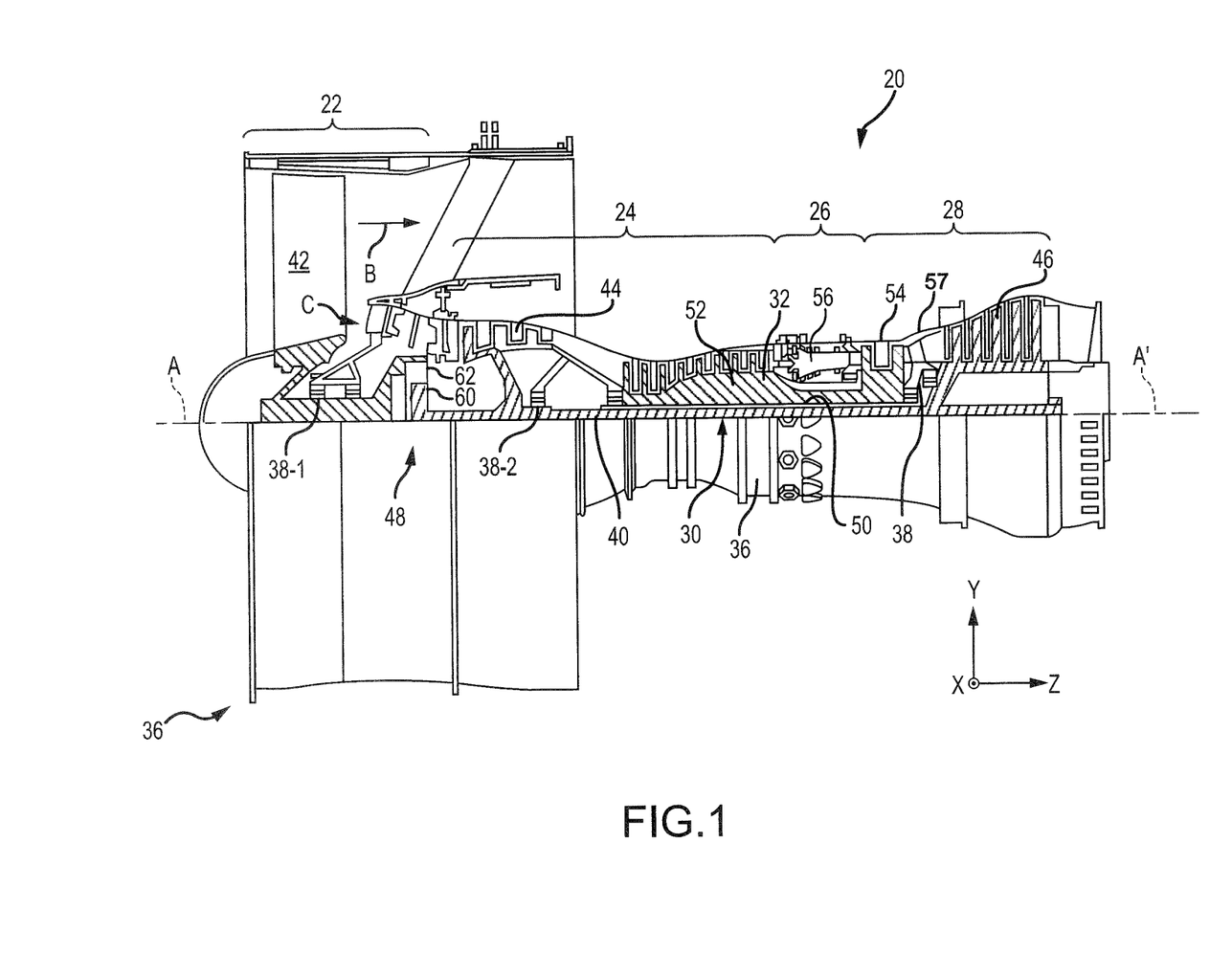
- FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26, and a turbine section 28. Alternative engines may include, for example, an augmentor section among other systems or features. In operation, fan section 22 can drive fluid (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, as well as industrial gas turbines.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine section 54. A combustor 56 may be located between high pressure compressor 52 and high pressure turbine 54. In various embodiments, engine static structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded through the high pressure turbine 54 and low pressure turbine 46.

Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). The low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans. A gas turbine engine may comprise an industrial gas turbine (IGT) or a geared engine, such as a geared turbofan, or non-geared engine, such as a turbofan, or may comprise any gas turbine engine as desired.

Low pressure compressor 44, high pressure compressor 52, low pressure turbine 46, and high pressure turbine 54 may comprise one or more stages or sets of rotating blades and one or more stages or sets of stationary (i.e., non-rotating) vanes axially interspersed with the rotating blade stages.

Figure 2:
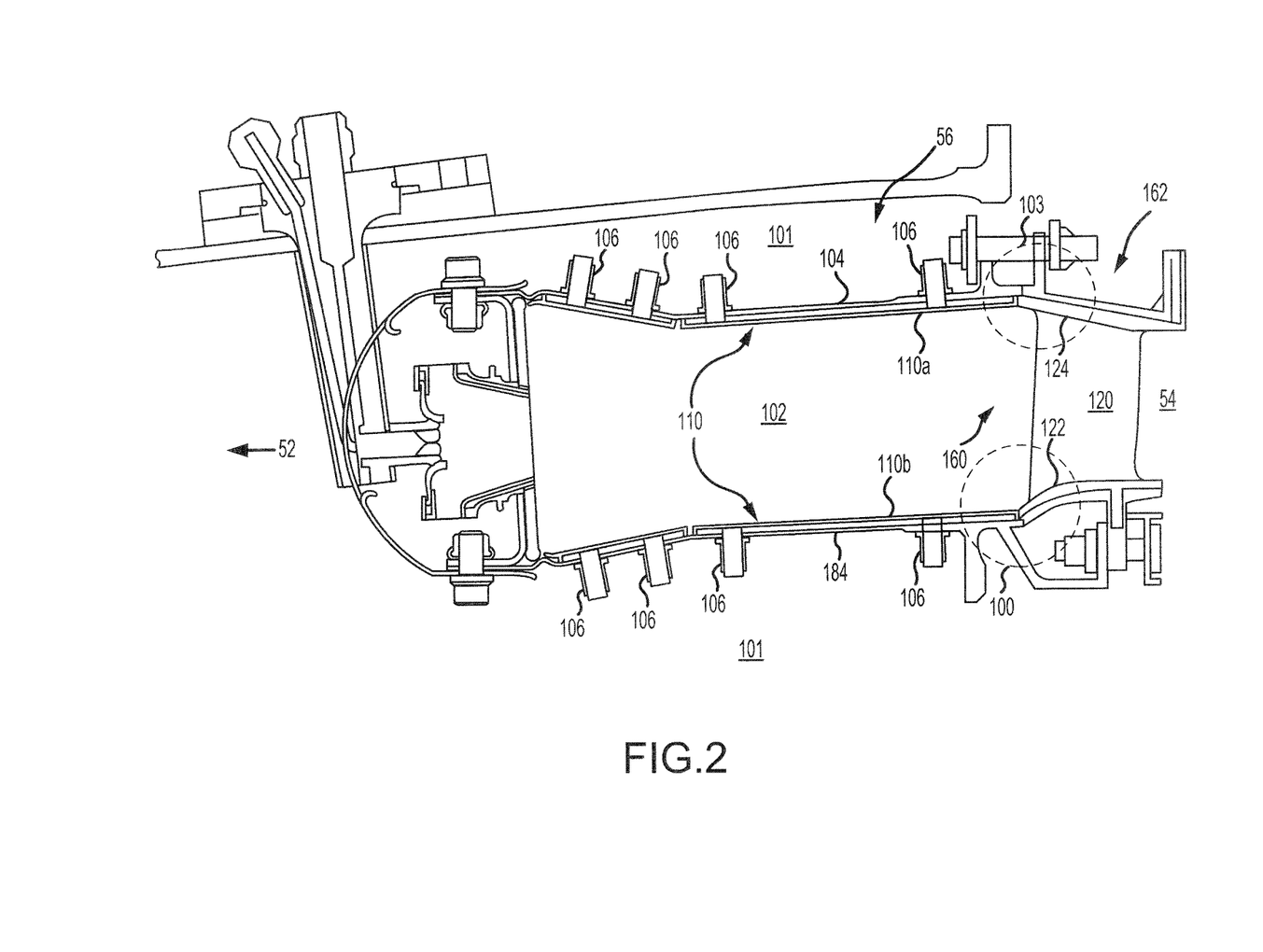
FIG. 2 illustrates a cross-sectional view of an exemplary combustor, in accordance with various embodiments.

FIG. 2 shows an exemplary cross-section of combustor 56 positioned between high pressure compressor 52 and high pressure turbine 54 of a gas turbine engine 20. Combustor 56 includes a combustor chamber 102 defined by an outer shell 104 and an inner shell 184. Inner shell 184 may be radially inward of outer shell 104. The combustor outer shell 104 and the combustor inner shell 184 may provide structural support to the combustor 56 and its components. For example, a combustor outer shell 104 and a combustor inner shell 184 may comprise a substantially cylindrical or a substantially conical canister portion defining an inner area comprising the combustor chamber 102.

It may be desirable to protect combustor outer shell 104 and combustor inner shell 184 from the high temperatures flames and/or combustion gases within combustion chamber 102. Accordingly, one or more combustor panels 110 (e.g., thermal shields, combustor liners) may be disposed inside the combustor chamber 102 and may provide such protection. The combustor panels 110 may be mounted and/or coupled to the combustor shell 104/184 via one or more attachment features 106. The panels 110 may be spaced apart from the interior surface of their associated shells. For example, one or more outboard combustor panels (e.g., panels 110a) may be arranged radially inward of the combustor outer shell 104 and one or more inboard combustor panels (e.g., panels 110b) may also be arranged radially outward of the combustor inner shell 184.

Combustor panels 110 may be made of any suitable heat tolerant material. In this manner, the combustor panels 110 may be substantially resistant to thermal mechanical fatigue in order to inhibit cracking of the combustor panels 110 and/or to inhibit liberation of portions of the combustor panels 110. In various embodiments, the combustor panels 110 may be made from a nickel based alloy and/or a cobalt based alloy, among others. For example, the combustor panels 110 may be made from a high performance nickel-based super alloy. In various embodiments, the combustor panels 110 may be made from a cobalt-nickel-chromium-tungsten alloy. The combustor panels 110 may comprise a partial cylindrical or conical surface section. The combustor panels 110 may comprise a variety of materials, such as metal, metal alloys, and/or ceramic matrix composites, among others.

A diffuser chamber 101 is external the combustor 56 and cooling air may be configured to flow through the diffuser chamber 101 around the combustor 56. Combustor chamber 102 may form a region for mixing of core airflow C (with brief reference to FIG. 1) and fuel, and may direct the high-speed exhaust gases produced by the ignition of this mixture inside the combustor 56. The high-speed exhaust gases may be driven downstream within the combustor 56 to a combustor outlet 160. Combustor outlet 160 may be located immediately ahead (i.e., immediately forward) of a fixed first vane stage 162 of high pressure turbine 54.

First vane stage 162 comprises a plurality of vane airfoils 120 that are connected by a vane inner platform 122 and a vane outer platform 124. First vane stage 162 tends to be the hottest of the vane stages within high pressure turbine 54, as first vane stage 162 is closest to combustor outlet 160. In this regard, vane inner platform 122, vane outer platform 124, and airfoils 120 tend to experience an increased and/or earlier occurrence of oxidation and/or other forms of heat damage, as compared to other more downstream (i.e., aft) vane stages. Accordingly, it may be desirable to cool first vane stage 162.

Figure 3A:
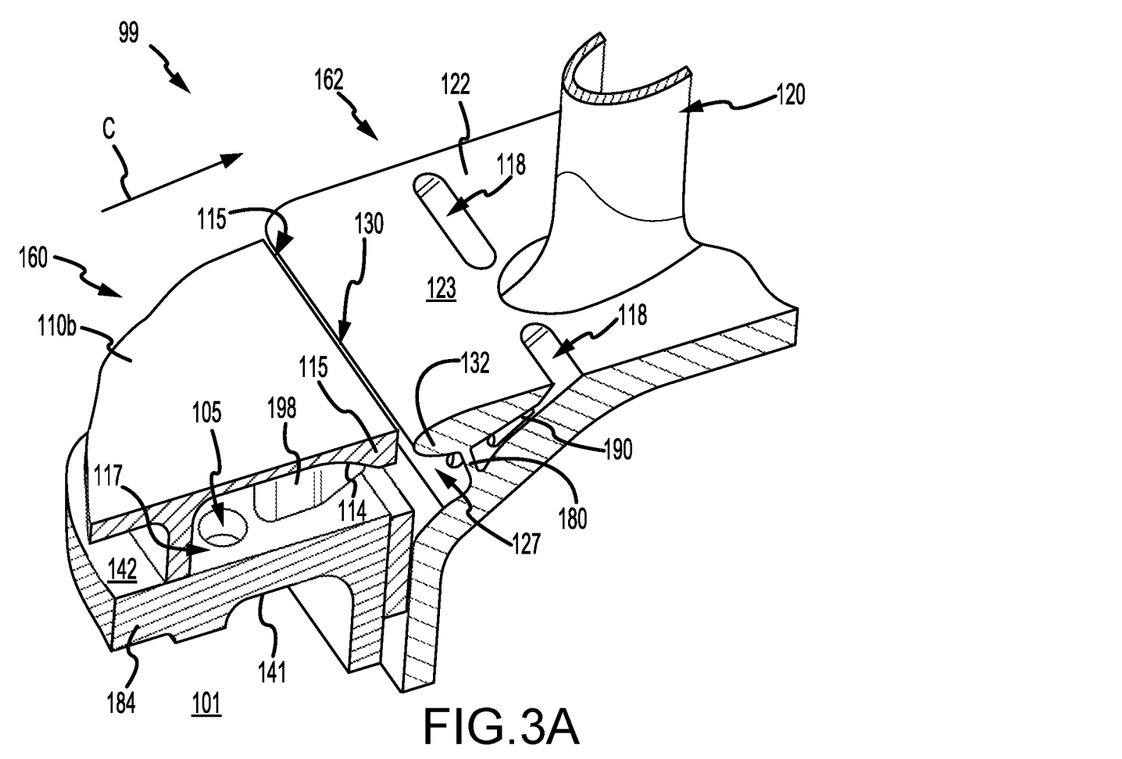
FIG. 3A illustrates a perspective view of a combustor outlet and vane platform interface, in accordance with various embodiments.
Figure 3B:
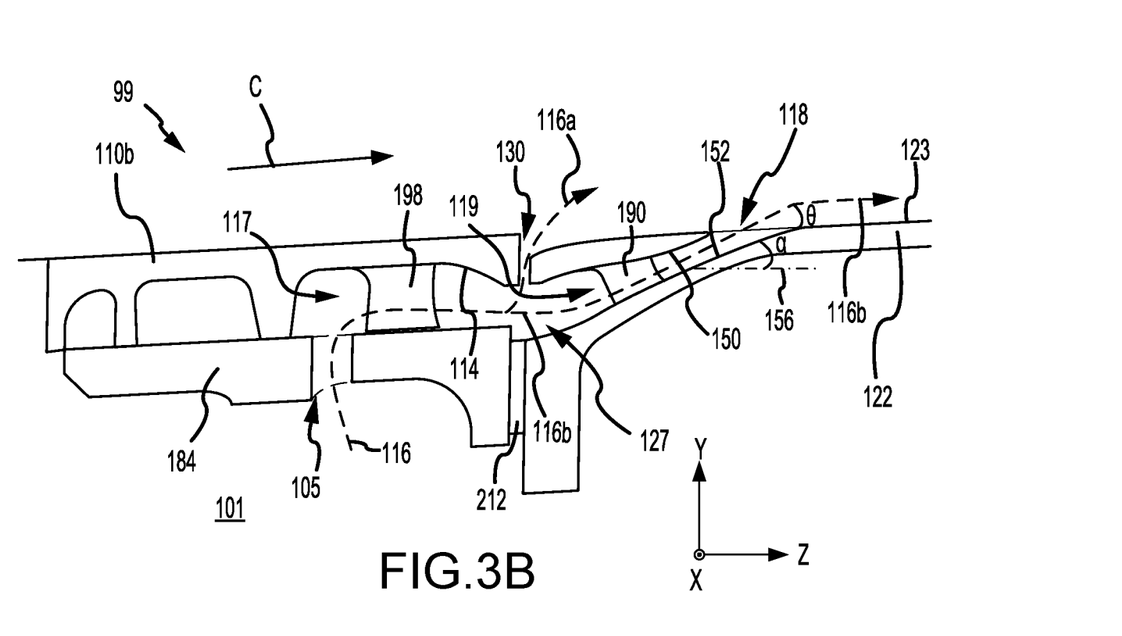
FIG. 3B illustrates a cross-sectional view of the combustor outlet/vane platform interface of FIG. 3A, in accordance with various embodiments.
Figure 3C:
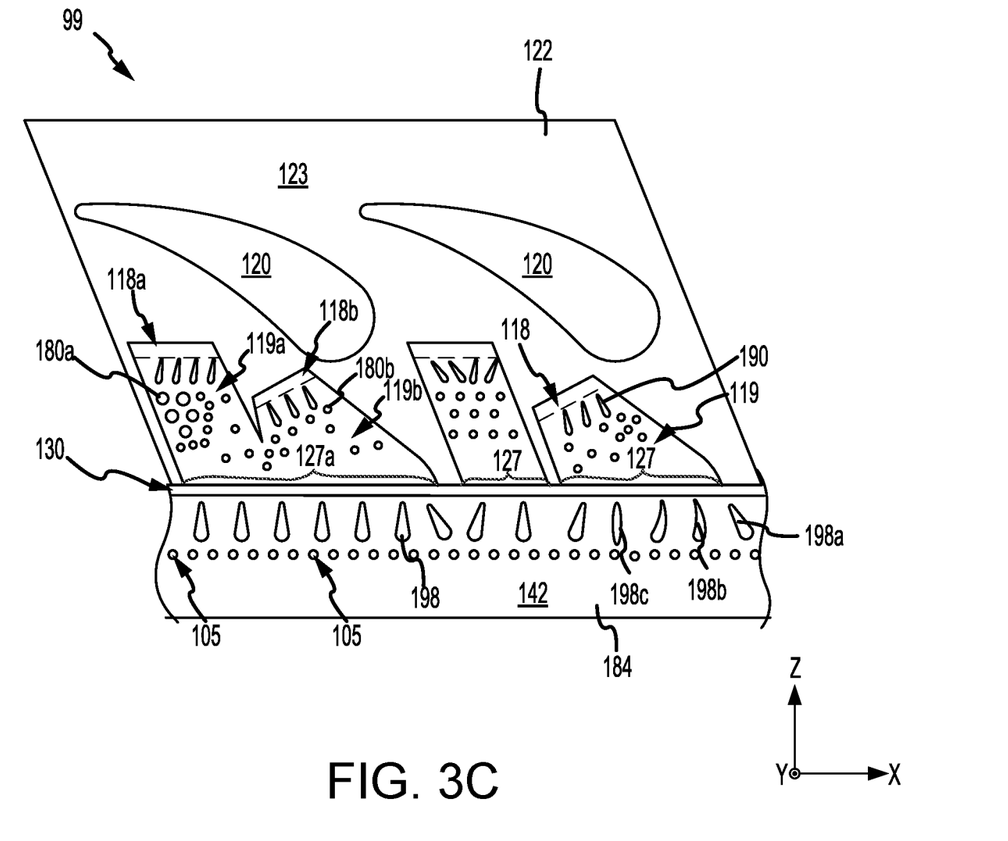
FIG. 3C illustrates a radially inward looking view of the combustor outlet/vane platform interface of FIG. 3A, in accordance with various embodiments.

With reference to FIG. 2 and FIGS. 3A, 3B, and 3C, features of a vane platform cooling system 99 at an inboard interface 100 between combustor outlet 160 and first vane stage 162 are illustrated, in accordance with various embodiments. While FIGS. 3A, 3B, and 3C illustrate the inboard interface 100 between combustor outlet 160 and first vane stage 162, it should be understood that an outboard interface 103, with momentary reference to FIG. 2, of combustor outlet 160 and first vane stage 162 (i.e., the interface between outer platform 124 and outer shell 104 and panels 110a) may include the elements and functionalities as described herein with respect to cooling system 99 at inboard interface 100 (i.e., at the interface between inner platform 122 and inner shell 184 and panels 110b).

In various embodiments, an annular cooling cavity 117 is formed and/or defined between the combustor inner shell 184 and panel 110b. As mentioned above, cooling air in the diffuser chamber 101 may enter the annular cooling cavity 117 via impingement holes or apertures 105 formed in inner shell 184. That is, impingement holes 105 may extend from a diffuser side 141 of the inner shell 184 to a combustor side 142 of the inner shell 184 and may supply cooling air 116 (FIG. 3B) into annular cooling cavity 117. Upon entering cavity 117, cooling air 116 may flow downstream (i.e., aft) toward a forward end 132 of inner platform 122.

In accordance with various embodiments, a plurality of orifices 127 may be formed in forward end 132 of inner platform 122. Upon exiting annular cooling cavity 117, a portion 116b of cooling airflow may flow into orifices 127. Orifices 127 may be fluidly coupled to one or more openings or apertures 118 formed through a surface 123 of inner platform 122 that is oriented toward core flow path C. Orifices 127 may be fluidly coupled to apertures 118 via one or more flow paths or channels 119.

With reference to FIG. 3B, channels 119 may include and may be defined, at least partially, by opposing surfaces 150 and 152 (referred to herein as interior channel surface 150 and exterior channel surface 152). A portion 116b of cooling air 116 may flow into orifices 127, through channels 119, out apertures 118, and along surface 123 of inner platform 122. Orifices 127, channels 119, and apertures 118 may be configured to create a protective coating or "blanket" of air film over surface 123 of inner platform 122, thereby protecting inner platform 122 from the hot combustion gases exiting combustor outlet 160. For example, channels 119 (e.g., interior channel surfaces 150 and/or exterior channel surfaces 152) may be configured such that portion 116b of cooling air 116 exits aperture 118 at an angle theta ($\theta$) of 30° or less, relative to surface 123 of platform 122. In various embodiments, angle $\theta$ may be 20° or less. In various embodiments, angle $\theta$ may be 15° or less. Stated differently, in various embodiments, an angle alpha ($\alpha$) formed by exterior channel surface 152 and a plane 156 parallel to surface 123 may be between 1° and 30°, 5° and 20°, or 10° and 17°. The focused air exiting apertures 118 may flow along surface 123 of inner platform 122 and may create a film over the inner platform 122 and individual vane airfoils 120 of first vane stage 162.

In various embodiments, more than one channel 119 and/or more than one aperture 118 may be associated (i.e., in fluid communication with) a single orifice 127. For example, with reference to FIG. 3C, channel 119a, aperture 118a, channel 119b, and aperture 118b are each in fluid communication with orifice 127a.

With continued reference to FIG. 3C, in various embodiments, one or more pins 180 and airflow structures 190 may be formed along channels 119. Pins 180 and airflow structures 190 may extend from surface 150 to surface 152, with momentary reference to FIG. 3B. Airflow structures 190 may direct portion 116b of cooling air 116 in a desired direction. Airflow structures 190 may comprise a tear drop shape (as shown), an airfoil shape (similar to the shape of airfoil 120), a race track or oval shape, or any other desired geometry. In this regard, the number, size, location, shape, and orientation of airflow structures 190 may be selected based on a desired cooling profile for vane stage 162. For example, the shape and orientation of airflow structures 190 may be selected to direct portion 116b of cooling air 116 toward areas of vane stage 162 where increased cooling airflow is desired (i.e., areas subject to increased temperatures or thermal stress) and away from areas where less cooling air flow is needed. For example, airflow structures 190 may direct portion 116b of cooling air 116 toward airfoils 120 and areas of surface 123 proximate to airfoils 120. Stated another way, airflow structures 190 may be used to increase a volume or flow rate of cooling air 116 in a first direction and decrease the volume or flow rate of cooling air 116 in a second direction.

Pins 180 may provide structure support and/or an increased surface area for heat exchange and improved cooling. Pins may also direct portion 116b of cooling air 116 in a desired direction. In this regard, the number, size, and location of pins 180 may be selected based on a desired cooling profile for vane stage 162. For example, pins 180 of larger diameter (e.g., pins 180a) or a great density of pins 180 (i.e., a greater number of pins 180 in a particular area) may be located where a decreased cooling airflow is desired, and pins 180 having a smaller diameter (e.g., pins 180b) or a decreased density of pins 180 may be located in areas where increased cooling airflow is desired. For example, pins 180 may be used to direct cooling air 116 over areas of surface 123 that are subject to increased temperatures or thermal stresses. Stated another way, pins 180 may be used to impede portion 116b of cooling air 116 from flowing in certain directions, thereby increasing the volume or flow rate of portion 116b of cooling air 116 in other directions. Pins 180 comprise a generally cylindrical or pedestal shape, though a square geometry, rectangular geometry, elliptical geometry, or other shaped geometry may also be employed.

In various embodiments, orifices 127, channels 119, apertures 118, pins 180, and airflow structures 190 may be formed during a manufacturing of inner platform 122. In this regard, inner platform 122 may be formed using, for example, a machining, integral casting, molding, or additive manufacturing process, and orifices 127, channels 119, apertures 118, pins 180, and airflow structure 190 may be formed during said process.

In various embodiments, and with reference to FIGS. 3A and 3B, an opening or gap 130 may be defined between an aft end 115 of combustor panel 110b and forward end 132 of inner platform 122. Gap 130 may be an axial space between combustor panel 110b and inner platform 122 (e.g., combustor panel 110b is axially spaced apart from inner platform 122). Gap 130 may fluidly connect annular cooling cavity 117 to core flow path C. Said differently, a portion 116a of cooling air 116 may flow from cavity 117, through the gap 130, and mix with the combustion gases exiting outlet 160.

It may be desirable to minimize the amount or portion 116a of cooling air 116 escaping through gap 130, and thereby maximize the amount or portion 116b of cooling air 116 supplied to orifices 127 and exiting apertures 118. In this regard, proximate to aft end 115, an exterior surface 114 of combustor panel 110b may be sloped or angled toward inner shell 184. As used herein, an "exterior" surface of a combustor panel refers to a combustor panel surface that is oriented away from combustion chamber 102, with momentary reference to FIG. 2. The slope of exterior surface 114 tends to direct the cooling air 116 exiting the aft end of interior cooling cavity 117 away from gap 130. The slope or angle of exterior surface 114 toward surface 142 of inner shell 184 may reduce the portion 116a of cooling air 116 flowing through channeling 130, thereby increasing the portion 116b of cooling air 116 flowing into orifice 127.

In various embodiments, a plurality of panel standoffs 198 may be located in cavity 117. Panel standoffs 198 may be integrally formed with exterior surface 114 of combustor panel 110b. In various embodiments, panel standoffs 198 may be formed during a manufacturing of combustor panel 110b. In this regard, combustor panel 110b may be formed using, for example, a machining, casting, molding, or additive manufacturing process, and panel standoffs 198 may be formed during said process. Panel standoffs 198 may extend from exterior surface 114 toward inner shell 184. Panel standoffs 198 may be located as close to surface 142 of inner shell 184 as possible. Stated differently, a radial distance between panel standoffs 198 and surface 142 of inner shell 184 tends to be minimized to decrease a volume of cooling air flow flowing between panel standoffs 198 and surface 142.

Panel standoffs 198 may be located downstream (i.e., aft) of holes 105. Panel standoffs 198 may be configured to direct cooling air 116 toward orifices 127 and forward end 132 of inner platform 122. Panel standoffs 198 may comprise a tear drop shape (e.g., 198a), a airfoil shape (e.g. 198b), a race track or oval shape (e.g., 198c), or any other desired geometry. The number, size, location, shape, and orientation of panel standoffs 198 may be selected based on a desired cooling profile for vane stage 162. For example, the shape and orientation of panel standoffs 198 may be selected to concentrate cooling air 116 in orifices 127 (and thus in apertures 118) configured to cool the areas of vane stage 162 that are subject to increased temperatures and/or thermal stress, and direct cooling air 116 away from orifices 127 and apertures 118 that are associated with areas of vane stage 162 in need of less cooling.

In various embodiments, a seal 212 may be located between inner shell 184 and inner platform 122. Seal 212 may prevent cooling air 116 from avoiding orifices 127 by blocking cooling air 116 from flowing radially inward between inner shell 184 and inner platform 122.

Figure 4A:
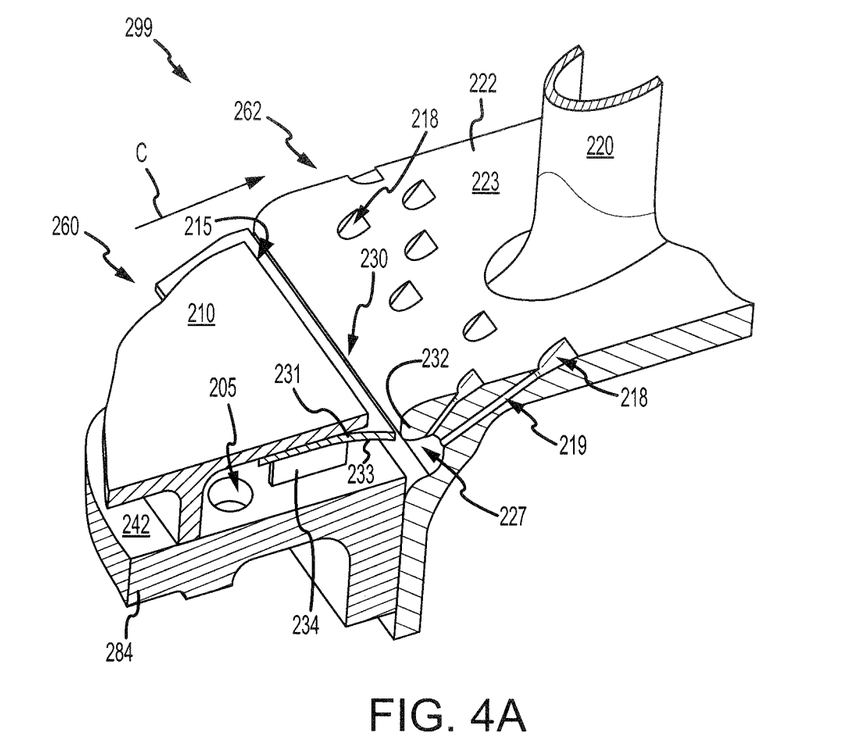
FIG. 4A illustrates a perspective view a combustor outlet and vane platform interface, in accordance with various embodiments.
Figure 4B:
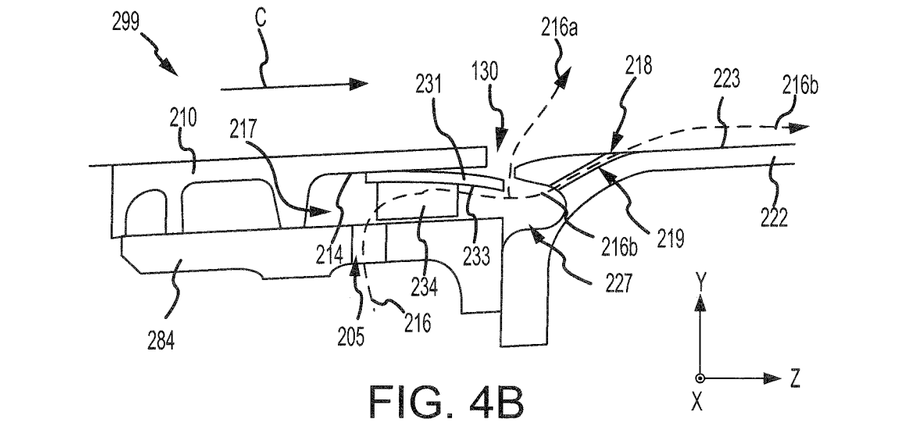
FIG. 4B illustrates a cross-sectional view of the combustor outlet/vane platform interface of FIG. 4A, in accordance with various embodiments.

FIGS. 4A and 4B illustrate a vane platform cooling system 299 at an inboard interface between a combustor outlet 260 and a first vane stage 262, in accordance with various embodiments. Combustor outlet 260 may be located at an aft end of a combustor panel 210, similar to combustor outlet 160 and combustor panels 110 in FIG. 2. Combustor panel 210 may be coupled to an inner combustor shell 284. First vane stage 262 comprises a plurality of vane airfoils 220 which are connected by a vane inner platform 222 and an outer vane platform, similar to vane outer platform 124 in FIG. 2. While FIGS. 4A and 4B illustrate the inboard interface of combustor outlet 260 and first vane stage 262, it should be understood that an outboard interface between combustor outlet 260 and first vane stage 262 (i.e., an interface between the outer vane platform and an outer combustor shell and panel) may include the elements and functionalities as described herein with respect to cooling system 299 at the inboard interface (i.e., at the interface between vane inner platform 222 and inner combustor shell 284 and combustor panel 210).

An annular cooling cavity 217 is formed and/or defined between combustor inner shell 284 and combustor panel 210. Cooling air 216 may enter cavity 217 via impingement holes or apertures 205 formed in the inner combustor shell 284. Upon entering cavity 217, cooling air 216 may flow downstream (i.e., aft) toward a forward end 232 of inner platform 222.

In accordance with various embodiments, a plurality of orifices 227 may be formed in forward end 232 of inner platform 222. Upon exiting annular cooling cavity 217 a portion 216b of cooling air 216 may flow into orifices 227. Orifices 227 may be fluidly coupled to one or more apertures 218. Apertures 218 may be formed through a surface 223 of inner platform 222. Surface 223 may be oriented toward core flow path C. Orifices 227 may be fluidly coupled to apertures 218 via one or more flow paths or channels 219. A diameter of orifices 227, as measured circumferentially, may be greater than a diameter or channels 219. In this regard, multiple channels 219 (and thus multiple apertures 218) may be in fluid communication with a single orifice 227.

Channels 219 and apertures 218 may be configured such that portion 216b of cooling air 216 exits aperture 218 at an angle θ, relative to surface 223, between 1° and 30°. In various embodiments, angle θ is between 5° and 20°. In various embodiments, angle θ is between 10° and 17°. Stated differently, in various embodiments, an angle α formed by channels 219 and a plane parallel to the z-axis may be between 1° and 30°, 5° and 20°, or 10° and 17°. In various embodiments, a cross-sectional area of each aperture 218 may be greater than a cross-sectional area of each channel 219. The increased cross-sectional area of apertures 218, as compared to the cross-sectional area of channels 219, tends to allow the portion 216b of cooling air 216 exiting apertures 218 to spread across surface 223. The increased cross-sectional area of apertures 218, as compared to the cross-sectional area of channels 219, also tends to decrease a flow rate (i.e., a volume of fluid passing per unit time, e.g., liters per second) of the cooling air as it exits apertures 218. The increased cross-sectional area of apertures 218, as compared the cross-sectional area of channels 219, may thus increase the surface area of the cooling air film over surface 223, thereby increasing the area protected from the hot combustion gases exiting combustor outlet 260.

In various embodiments, orifices 227, channels 219, and apertures 218 may be formed after a manufacturing of inner platform 222. In this regard, orifices 227, channels 219, and apertures 218 may be incorporated (i.e., retrofitted) into existing inner platforms 222. For example, orifices 227, channels 219, and apertures 218 may be formed by electrical discharge machining (EDM), laser drilling, punching, or any other suitable manufacturing process.

In various embodiments, a gap 230 may be defined between aft end 215 of combustor panel 210 and forward end 232 of inner platform 222. Gap 230 may be an axial gap. A portion 216a of cooling air 216 may flow from cavity 217, through gap 230, and mix with the combustion gases exiting outlet 260. To minimize the portion 216a of cooling air 216 escaping through gap 230, a ramp 231 may be located in cavity 217. Ramp 231 may be coupled to an exterior surface 214 of combustor panel 210 (i.e., to a surface of combustor panel 210 that is oriented toward inner combustor shell 284 and away from the combustion chamber). Ramp 231 may comprise an angle or sloped surface 233. Surface 233 may be angled or sloped toward a surface 242 of inner combustor shell 284. The angle or slope of surface 233 may direct the cooling air exiting cavity 217 away from gap 230. Directing cooling air 216 away from gap 230 may reduce the portion 216a of cooling air 216 escaping through gap 231, and thereby increase the portion 216b of cooling air 216 supplied to orifices 227 and exiting apertures 218.

Ramp 231 may be discrete from combustor panel 210. Stated differently, ramp 231 may be formed in a manufacturing process separate from combustor panel 210. In this regard, ramp 231 may be incorporated (i.e., retrofitted) onto existing combustor panels. Ramp 231 may be coupled to the exterior surface of combustor panel 210 in any suitable manner. For example, ramp 231 may be welded or brazed to combustor panel 210. In various embodiments, fasteners (e.g., clips, screws, bolts, etc.) may employed to coupled ramp 231 to combustor panel 210.

In accordance with various embodiments, standoffs 234 may be located in cavity 217. Standoffs 234 may be integrally formed with ramp 231. In various embodiments, standoffs 234 may be coupled (e.g., welded or brazed) to surface 233 of ramp 231. Standoffs 234 may extend from surface 233 toward inner combustor shell 284. Standoffs 234 are located as close to surface 242 of inner combustor shell 284 as possible. Stated differently, a radial distance between standoffs 234 and surface 242 is minimized to decrease a volume of cooling air 216 flowing between standoffs 234 and surface 242.

Standoffs 234 may be located downstream (i.e., aft) of holes 205 and may direct cooling air 216 toward forward end 232 of inner platform 222 and toward orifices 227. Standoffs 234 may comprise a tear drop shape, a airfoil shape, a race track or oval shape, or any other desired geometry. The number, size, location, shape, and orientation of standoffs 234 may be selected based on a desired cooling profile for vane stage 262. For example, the shape and orientation of standoffs 234 may be selected to concentrate cooling air 216 in orifices 227 and/or apertures 218, which create cooling film over the areas of vane stage 262 that are most susceptible to thermal stress, and/or to direct cooling air 216 away from orifices 227 and apertures 218 that are associated with cooler areas of vane stage 262. Standoffs 234 may introduce swirl or may direct cooling air 216 straight toward the forward end 232 of inner panel 222. Standoffs 234, in combination with the size, location, and number of holes 205, may meter the flow rate of cooling air 216.

Ramp 231 and standoffs 234 may increase the amount of cooling air suppled to orifices 227 and apertures 218. Orifices 227, channels 219, and apertures 218 may cause the portion 216b of cooling air 216 exiting apertures 218 to form a cooling film along surface 233. Orifices 227, channels 219, and apertures 218 may also direct the portion 216b of cooling air 216 exiting apertures 218 toward areas that experience increased oxidation or other thermal stresses. Controlling a cooling of the vane platform may result in increased part life, which tends to decrease costs.

Figure 5:
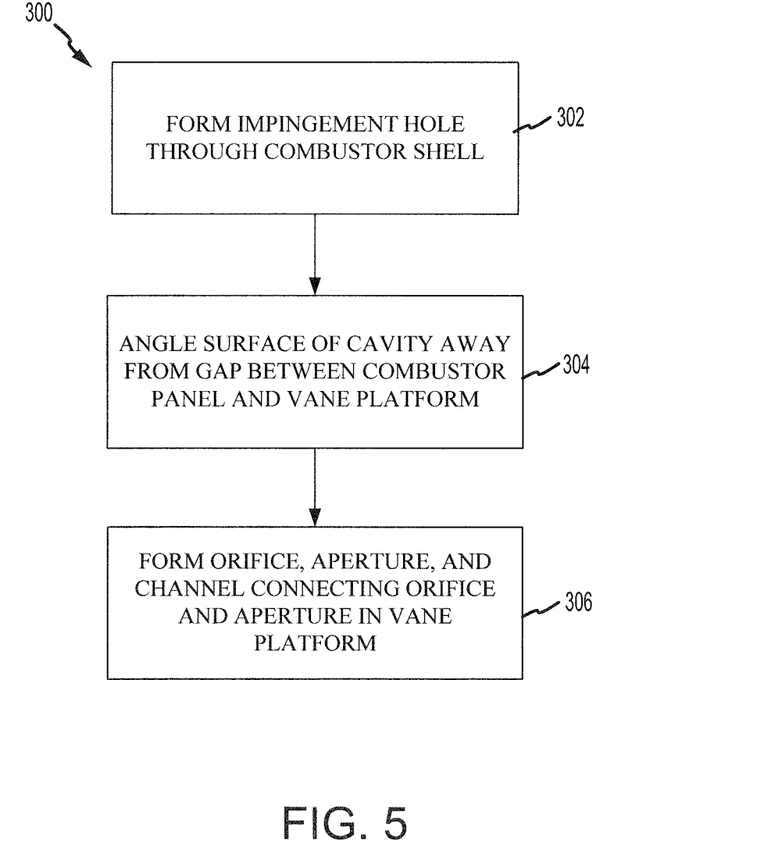
FIG. 5 illustrates a method of cooling a first vane stage platform system of a high pressure turbine, in accordance with various embodiments.

Referring to FIG. 5, a method 300 of cooling a first vane stage of a high pressure turbine is illustrated, in accordance with various embodiments. Method 300 may comprise forming an impingement hole through a combustor shell (step 302). The impingement hole may allow cooling air to flow into a cavity located between the combustor shell and a combustor panel. Method 300 may further comprise angling a surface of the cavity away from a gap defined by an aft end the combustor panel and a vane platform of the first vane stage (step 304). A step 306 of method 300 may comprise forming an orifice in a forward end of the vane platform, forming a aperture in a surface of the vane platform, and forming a channel fluidly connecting the orifice and the aperture.

In various embodiments, step 306 of method 300 may further comprise forming a plurality of airflow structures in the channel. Each airflow structure of the plurality of airflow structures may comprise at least one of a teardrop shape, an airfoil shape, or a racetrack shape. The orifice, the aperture, the channel, and the plurality of airflow structures may be formed during a manufacturing of the vane platform. In various embodiments, step 304 may comprise manufacturing the combustor panel to include a sloped exterior surface. In various embodiments, step 304 may comprise coupling a discrete ramp to an exterior surface of the combustor panel. In various embodiments, step 306 may further comprise forming the orifice, the aperture, and the channel by at least one of electrical discharge machining, laser drilling, or punching through the vane platform.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A vane platform cooling system, comprising:
   a vane platform;
   an orifice formed in a forward end of the vane platform;
   a first aperture formed in a first surface of the vane platform;
   a first channel defined between an interior channel surface and an exterior channel surface, the first channel formed through the vane platform and connecting the orifice and the first aperture;
   a combustor shell located forward of the vane platform;
   a combustor panel coupled to the combustor shell; and
   a cavity located between the combustor shell and the combustor panel and in flow communication with the first channel,
   wherein at an aft end of the combustor panel, an exterior surface of the combustor panel is angled toward an interior surface of the combustor shell such that air exiting the cavity at the aft end of the combustor panel is directed in a radial direction toward the exterior channel surface of the first channel and away from a gap between the first surface of the vane platform and the aft end of the combustor panel.

2. The vane platform cooling system of claim 1, wherein the first channel is configured such that air exits the first aperture at a first angle of less than 20° relative to the first surface of the vane platform.

3. The vane platform cooling system of claim 2, wherein a second angle formed by the exterior channel surface of the first channel and a plane parallel to the first surface of the vane platform is between 5° and 15°.

4. The vane platform cooling system of claim 2, wherein a cross-sectional area of the first aperture is greater than a cross-sectional area of the first channel.

5. The vane platform cooling system of claim 1, further comprising:
 a second aperture formed in the first surface of the vane platform; and
 a second channel formed through the vane platform, wherein the second channel connects the orifice and the second aperture.

6. The vane platform cooling system of claim 1, further comprising an airflow structure located in the first channel.

7. The vane platform cooling system of claim 6, wherein the airflow structure comprises at least one of a teardrop shape, an airfoil shape, a pedestal shape, or a racetrack shape.

8. The vane platform cooling system of claim 1, wherein the combustor shell defines an impingement hole.

9. The vane platform cooling system of claim 1, further comprising a standoff located in the cavity, the standoff comprising at least one of a teardrop shape, an airfoil shape, or a racetrack shape.

10. A gas turbine engine, comprising:
 a combustor comprising,
  a combustor shell defining a combustion chamber of the combustor,
  a combustor panel disposed inside the combustion chamber, and
  a cavity located between the combustor shell and the combustor panel;
 a vane platform located at the aft end of the combustor panel;
 an orifice formed in a forward end of the vane platform;
 a first aperture formed in a first surface of the vane platform; and
 a first channel formed through the vane platform and connecting the orifice and the first aperture, the first channel being in flow communication with the cavity, wherein the first channel is defined between an interior channel surface and an exterior channel surface, and
 wherein an exterior surface of the combustor panel is angled toward an interior surface of the combustor shell at an aft end of the combustor panel such that air exiting the cavity at the aft end of the combustor panel is directed in a radial direction toward the exterior channel surface of the first channel and away from a gap located between the aft end of the combustor panel and the first surface of the vane platform.

11. The gas turbine engine of claim 10, further comprising a plurality of airflow structures located in the first channel, wherein a first airflow structure of the plurality of airflow structures is configured to direct airflow in a first direction, and wherein a second airflow structure of the plurality of airflow structures is configured to direct airflow in a second direction different from the first direction.

12. The gas turbine engine of claim 10, further comprising:
 a second aperture formed in the first surface of the vane platform; and
 a second channel formed through the vane platform and connecting the orifice and the second aperture.

13. A method of cooling a first vane stage platform system of a high pressure turbine, comprising:
 forming an impingement hole through a combustor shell, wherein the impingement hole allows cooling air to flow into a cavity located between the combustor shell and a combustor panel coupled to the combustor shell, wherein an exterior surface of the combustor panel is angled toward an interior surface of the combustor shell at an aft end of the combustor panel;
 forming an orifice in a forward end of a vane platform of the first vane stage platform system;
 forming an aperture in a first surface of the vane platform;
 forming a channel fluidly connecting the orifice and the aperture and in flow communication with the cavity wherein the channel is defined between an interior channel surface and an exterior channel surface; and
 angling the exterior surface of the combustor panel such that air exiting the cavity is directed in a radial direction toward the exterior channel surface of the channel and away from a gap between the aft end of the combustor panel and the first surface of the vane platform.

14. The method of claim 13, further comprising forming a plurality of airflow structures in the channel, wherein each airflow structure of the plurality of airflow structures comprises at least one of a teardrop shape, an airfoil shape, a pedestal shape, or a racetrack shape, and wherein the orifice, the aperture, the channel, and the plurality of airflow structures are formed during a manufacturing of the vane platform.

15. The method of claim 13, further comprising forming the orifice, the aperture, and the channel by at least one of integral casting, electrical discharge machining, laser drilling, or punching through the vane platform.

\* \* \* \* \*